UNITED STATES PATENT OFFICE.

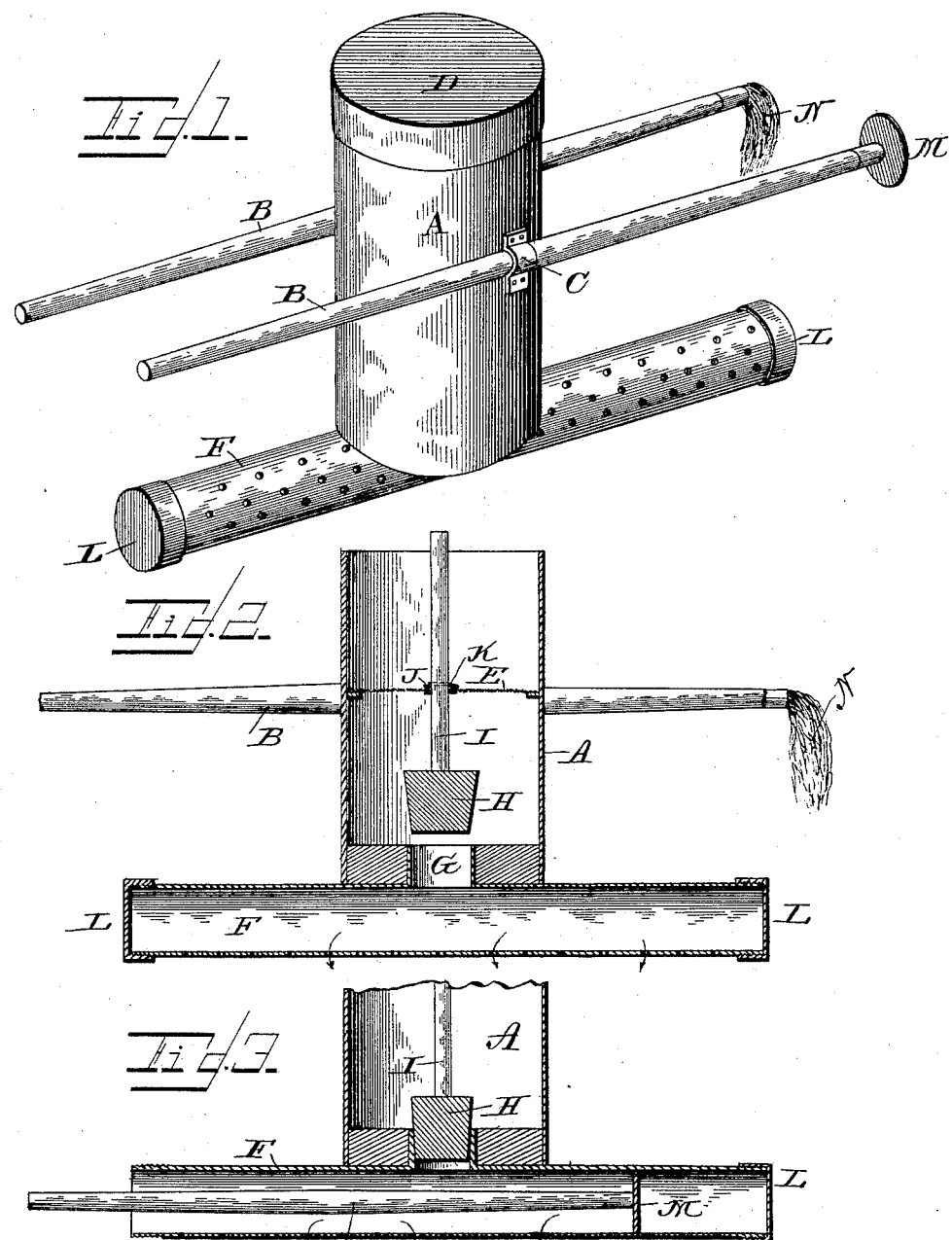

DARIUS STEVENS, OF CENTER SQUARE, INDIANA.

HAND-SPRINKLER.

SPECIFICATION forming part of Letters Patent No. 466,633, dated January 5, 1892.

Application filed May 25, 1891. Serial No. 393,987. (No model.)

*To all whom it may concern:*

Be it known that I, DARIUS STEVENS, a citizen of the United States, and a resident of Center Square, in the county of Switzerland and State of Indiana, have invented certain new and useful Improvements in Hand-Sprinklers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved sprinkler. Fig. 2 is a longitudinal sectional view of the same on a vertical plane through the middle of the tank or reservoir, and Fig. 3 is a similar view illustrating the method of cleaning out the sprinkler-pipe.

Like letters of reference denote corresponding parts in all the figures.

This invention relates to devices for sprinkling tobacco-plants or other plants growing in hills or rows with water or solutions of poisonous or fertilizing material; and it consists in the peculiar construction and combination of parts of a hand-sprinkling device of that type whereby the sprinkler-pipe may be readily cleaned in the field when necessary, so that the device will always be in condition to work satisfactorily.

Reference being had to the accompanying drawings, the letter A designates a tank or barrel, made of wood or metal, of suitable size and capacity, so that when filled with water or other liquid it can be readily carried by two men by means of the carrier-poles B B, which are inserted removably through ears C on opposite sides of the tank. In the top of the tank, below the removable cover D, is placed, removably, a sieve or filter E, and to the under side of the tank is permanently fastened the transverse sprinkler-pipe F, with the interior of which the tank communicates through an opening G in its bottom. This opening may be closed by a tapering plug H, affixed to the lower end of a handle I, of such length that its upper end will reach to the top or open end of the tank. To prevent the sieve E from being in the way it is made with a cylindrical sleeve or collar J, through which the upper end of the handle I projects, so that the plug may be removed from the opening or replaced by manipulating the handle without disturbing the sieve or filter.

The under side of pipe F is provided with numerous fine apertures, through which the contents of the tank may escape in the form of fine spray when the plug is lifted out of the pipe-inlet G. When this inlet is open, the stopper is prevented from falling down and closing it by a pin K, inserted transversely through an aperture in the upper end of the handle and resting upon the collar J. When it is desired to stop the flow of water, the plug may be reinserted simply by removing the pin K, when it will drop into place by its own gravity.

The open ends of the sprinkler-pipe F are closed by removable caps L L, one at each end, so that by removing these caps any sediment which may have collected in the bottom of the pipe and thus have a tendency to choke up the apertures can readily be scraped out. When using fertilizing solutions, sediment is apt to collect and settle in the pipe, which would soon become useless unless means are provided whereby it may be cleaned when occasion requires. For this purpose one of the carrier-poles B is provided at one end with a scraper-disk M, while the other pole may similarly be provided at one end with a swab N. In this manner the pipe may be cleaned in the field simply by removing the pipe-caps L L and using the carrier-pole with its scraper, as illustrated in Fig. 3.

The sieve E is employed when the apparatus is used for watering to free the water from twigs, leaves, &c., which, if not removed, would be apt to choke up the bottom opening G.

Having thus described my invention, I claim and desire to secure by Letters Patent of the United States—

The combination, in a hand-sprinkler, of the tank A, having bottom aperture G, sieve E, having collar J, stopper H, having handle I and pin K, and foraminated pipe F, having removable end caps L L, substantially as and for the purpose herein shown and described.

In testimony that I claim the foregoing as my own I have hereunto affixed my signature in presence of two witnesses.

DARIUS $\overset{\text{his}}{+}$ STEVENS.
$\phantom{DARIUS\ }{\text{mark}}$

Witnesses:
 PHILANDER S. SAGE,
 JOHN H. SHADDAY.